United States Patent
Nabeshima

(10) Patent No.: US 9,313,406 B2
(45) Date of Patent: Apr. 12, 2016

(54) DISPLAY CONTROL APPARATUS HAVING TOUCH PANEL FUNCTION, DISPLAY CONTROL METHOD, AND STORAGE MEDIUM

(71) Applicant: CANON KABUSHIKI KAISHA, Tokyo (JP)

(72) Inventor: Rui Nabeshima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 264 days.

(21) Appl. No.: 14/012,054

(22) Filed: Aug. 28, 2013

(65) Prior Publication Data
US 2014/0063321 A1   Mar. 6, 2014

(30) Foreign Application Priority Data

Aug. 29, 2012 (JP) ................................ 2012-188619

(51) Int. Cl.
*H04N 5/232* (2006.01)
*G06F 3/0488* (2013.01)
*G06F 3/0485* (2013.01)

(52) U.S. Cl.
CPC .......... *H04N 5/23293* (2013.01); *G06F 3/0485* (2013.01); *G06F 3/04883* (2013.01); *H04N 5/23216* (2013.01); *G06F 2203/04104* (2013.01); *G06F 2203/04808* (2013.01)

(58) Field of Classification Search
CPC ........... H04N 5/23293; H04N 5/23216; G06F 3/04883; G06F 3/0485; G06F 2203/04808
See application file for complete search history.

(56) References Cited

U.S. PATENT DOCUMENTS

| 5,825,352 A | * | 10/1998 | Bisset | ..................... G06F 3/044 345/157 |
| 8,378,973 B2 | * | 2/2013 | Chiu | ................... G06F 3/04855 178/18.01 |
| 8,520,029 B2 | | 8/2013 | Nagasaka | |
| 2006/0001652 A1 | * | 1/2006 | Chiu et al. | ..................... 345/173 |

(Continued)

FOREIGN PATENT DOCUMENTS

| CN | 102455875 A | 5/2012 |
| CN | 102576290 A | 7/2012 |

(Continued)

OTHER PUBLICATIONS

Office Action issued in CN201310385061.X, mailed Jan. 19, 2016. English translation provided.

*Primary Examiner* — Ahmed A Berhan
(74) *Attorney, Agent, or Firm* — Rossi, Kimms & McDowell LLP

(57) ABSTRACT

A display control apparatus which is capable of preventing incorrect operation against user's intent during multi-touch operation. When a touch at one point is detected, and then, plural touches are not detected until any touch at one point is not detected, scrolling is performed in response to the touch at one point leaving a display while moving irrespective of whether a predetermined condition is satisfied. When touches at a plurality of points are detected, and then, a touch at only one point is detected, scrolling is performed in response to moving of the touch at one point while it is continuously detected irrespective of whether the predetermined condition is satisfied. When the predetermined condition is satisfied, and then, the touch leaves the display while moving, scrolling is performed. When the touch at one point leaves the display without satisfying the predetermined condition, scrolling is not performed.

18 Claims, 12 Drawing Sheets

(56) References Cited

U.S. PATENT DOCUMENTS

| | | |
|---|---|---|
| 2011/0090155 A1 | 4/2011 | Caskey et al. |
| 2011/0126097 A1* | 5/2011 | Isono ............ G06F 3/0485 715/702 |
| 2011/0179381 A1 | 7/2011 | King |
| 2012/0096393 A1 | 4/2012 | Shim et al. |

FOREIGN PATENT DOCUMENTS

| | | |
|---|---|---|
| JP | 63-174125 A | 7/1988 |
| JP | 2008-299474 A | 12/2008 |
| JP | 2012-053623 A | 3/2012 |
| TW | 200602959 A | 1/2006 |

* cited by examiner

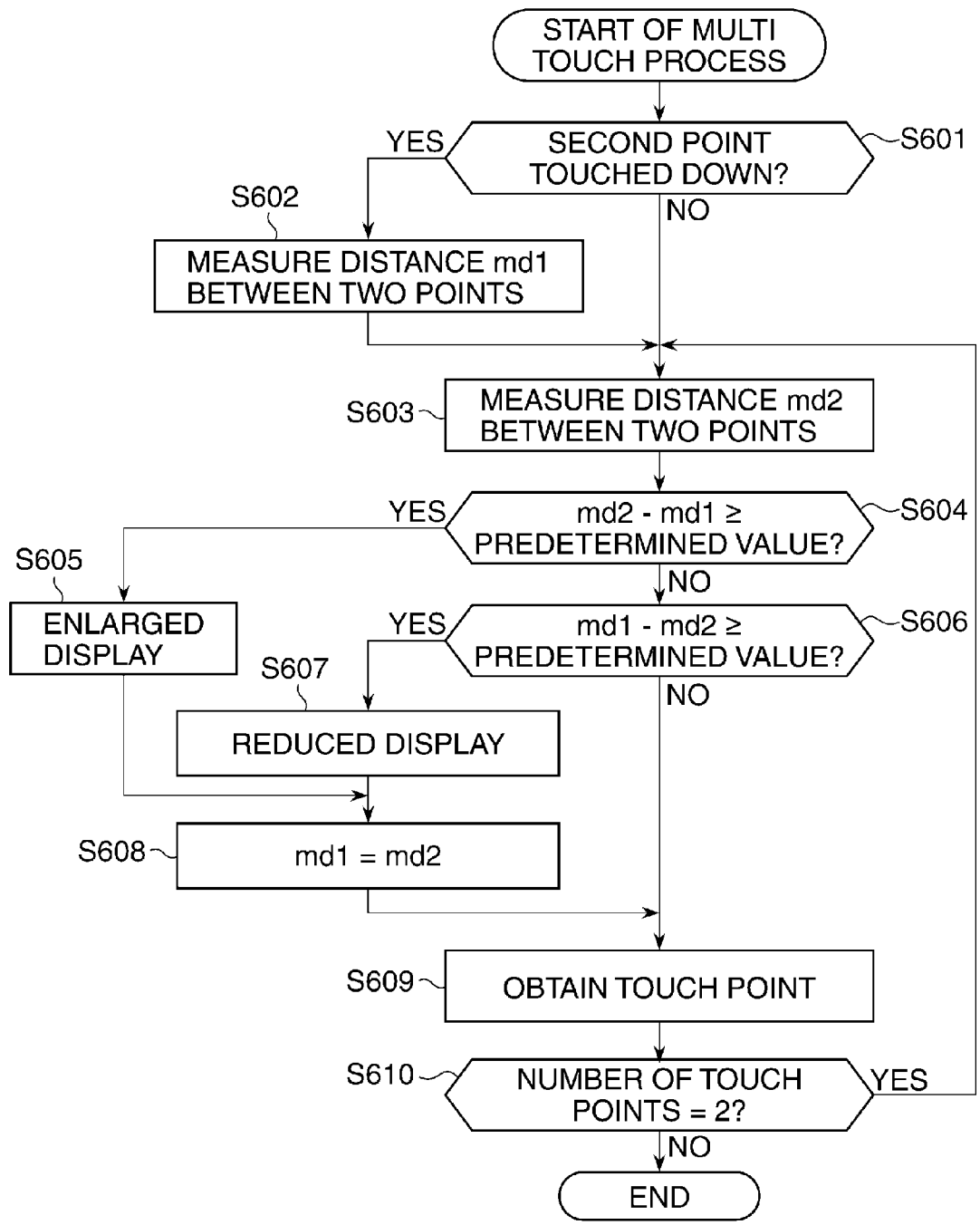

DISPLAY CONTROL APPARATUS HAVING TOUCH PANEL FUNCTION, DISPLAY CONTROL METHOD, AND STORAGE MEDIUM

BACKGROUND OF THE INVENTION

1. Field of the Invention

The present invention relates to a display control apparatus having a touch panel function, a display control method therefor, and a computer-readable storage medium storing a program for implementing the display control method.

2. Description of the Related Art

In recent years, as digital equipment capable of being intuitively operated, there have been those which have a touch panel and changes displays by operating objects displayed on the touch panel with a finger (fingertip). For example, there has been proposed a method in which a touch panel is touched with a finger, and the finger is moved while being kept in contact with the touch panel to scroll a screen in a direction in which the finger is moved, and also, the finger is quickly moved along the screen and released to cause momentum scrolling of the screen in a direction in which the finger has moved (see Japanese Laid-Open Patent Publication (Kokai) No. S63-174125). It should be noted that momentum scrolling means control to scroll a screen (displayed object) while slowing down even after moving a finger having touched the screen off the screen, and eventually stop scrolling.

Also, there has been proposed a method in which an object displayed on a touch panel is enlarged or reduced by pinching operation that increases and decreases the distance between two fingers on the touch panel (see Japanese Laid-Open Patent Publication (Kokai) No. 2012-53623). Further, there has been proposed a technique that regards a midpoint between two points touched on a touch panel as a designated position, and places image data displayed closest to the designated position at the designated position or its vicinity after pinching operation (Japanese Laid-Open Patent Publication (Kokai) No. 2008-299474).

However, when touch-up timing of two fingers after operation using two fingers such as pinching operation is off, scrolling may occur against user's intent. Particularly in the case of momentum scrolling, the distance of movement by scrolling may be longer than the moving distance of a touch point, and hence information desired to be displayed may be displayed at a position far from a desired display position.

SUMMARY OF THE INVENTION

The present invention provides a display control apparatus and a display control method therefor, which are capable of preventing incorrect operation against user's intent during multi-touch operation, as well as a computer-readable storage medium storing a program for implementing the display control method.

Accordingly, a first aspect of the present invention provides a display control apparatus comprising a touch detection unit configured to be capable of detecting at least a touch at one point on a display screen of a display unit, and a control unit configured to (a) provide, when the touch detection unit detects a touch at one point, and after that, touches at a plural points are not detected until any touch at one point is not detected, control such that a display object displayed on the display screen is scrolled after the touch at one point leaves the display screen in response to the touch at one point leaving the display screen while moving on the display screen irrespective of whether the touch at one point satisfies a predetermined condition, (b) provide, when the touch detection unit detects touches at a plurality of points, and after that, a touch at only one point is detected, control such that the display object is scrolled in response to moving of a touch position of the touch at one point while the touch at one point is continuously detected irrespective of whether the touch at one point satisfies the predetermined condition, (c) provide, when the touch detection unit detects touches at a plurality of points, and after that, a touch at only one point is detected, and when the touch at one point satisfies the predetermined condition, and after that, the touch at one point leaves the display screen while moving on the display screen, control such that the display object is scrolled after the touch at one point leaves the display screen, and (d) provide, when the touch detection unit detects touches at a plurality of points, and after that, a touch at only one point is detected, and when the touch at one point leaves the display screen without satisfying the predetermined condition, control such that the display object is not scrolled after the touch at one point leaves the display screen.

Accordingly, a second aspect of the present invention provides a control method for a display control apparatus having a display unit that has a display screen and is capable of detecting at least a touch at one point on the display screen, the control method comprising control step of (a) providing, when the touch detection unit detects a touch at one point, and after that, touches at a plural points are not detected until any touch at one point is not detected, control such that a display object displayed on the display screen is scrolled after the touch at one point leaves the display screen in response to the touch at one point leaving the display screen while moving on the display screen irrespective of whether the touch at one point satisfies a predetermined condition, (b) providing, when the touch detection unit detects touches at a plurality of points, and after that, a touch at only one point is detected, control such that the display object is scrolled in response to moving of a touch position of the touch at one point while the touch at one point is continuously detected irrespective of whether the touch at one point satisfies the predetermined condition, (c) providing, when the touch detection unit detects touches at a plurality of points, and after that, a touch at only one point is detected, and when the touch at one point satisfies the predetermined condition, and after that, the touch at one point leaves the display screen while moving on the display screen, control such that the display object is scrolled after the touch at one point leaves the display screen, and (d) providing, when the touch detection unit detects touches at a plurality of points, and after that, a touch at only one point is detected, and when the touch at one point leaves the display screen without satisfying the predetermined condition, control such that the display object is not scrolled after the touch at one point leaves the display screen.

Accordingly, a third aspect of the present invention provides a display control apparatus comprising a touch detection unit configured to be capable of detecting at least a touch at one point on a display screen of a display unit, and a control unit configured to (a) provide, when the touch detection unit detects a touch at one point, and after that, touches at a plural points are not detected until any touch at one point is not detected, control such that a plurality of items displayed on the display screen are scrolled in response to moving of a touch position of the touch at one point while the touch at one point is continuously detected, (b) provide control such that the plurality of items are scrolled after the touch at one point leaves the display screen in response to the touch at one point leaving the display screen while moving on the display screen, and (c) provide, when the touch detection unit detects touches at a plurality of points, and after that, a touch at only one point is detected, control such that an item to be selected is changed from a first item to a second item among the plurality of items in accordance with, without scrolling the plurality of items, a touch position of the touch at one point after the touch at one point satisfying a predetermined condition.

Accordingly, a fourth aspect of the present invention provides a control method for a display control apparatus having a touch detection unit that is capable of detecting at least a touch at one point on a display screen of a display unit, the control method comprising control step of (a) providing, when the touch detection unit detects a touch at one point, and after that, touches at a plural points are not detected until any touch at one point is not detected, control such that a plurality of items displayed on the display screen are scrolled in response to moving of a touch position of the touch at one point while the touch at one point is continuously detected, (b) providing control such that the plurality of items are scrolled after the touch at one point leaves the display screen in response to the touch at one point leaving the display screen while moving on the display screen, and (c) providing, when the touch detection unit detects touches at a plurality of points, and after that, a touch at only one point is detected, control such that an item to be selected is changed from a first item to a second item among the plurality of items in accordance with, without scrolling the plurality of items, a touch position of the touch at one point after the touch at one point satisfying a predetermined condition.

Accordingly, a fifth aspect of the present invention provides a non-transitory computer-readable storage medium storing a program for causing a computer to implement a control method for a control method for a display control apparatus having a display unit that has a display screen on which a display object is to be displayed and a touch detection unit that is capable of detecting at least a touch at one point on the display screen, the control method comprising control step of (a) providing, when the touch detection unit detects a touch at one point, and after that, touches at a plural points are not detected until any touch at one point is not detected, control such that a display object displayed on the display screen is scrolled after the touch at one point leaves the display screen in response to the touch at one point leaving the display screen while moving on the display screen irrespective of whether the touch at one point satisfies a predetermined condition, (b) providing, when the touch detection unit detects touches at a plurality of points, and after that, a touch at only one point is detected, control such that the display object is scrolled in response to moving of a touch position of the touch at one point while the touch at one point is continuously detected irrespective of whether the touch at one point satisfies the predetermined condition, (c) providing, when the touch detection unit detects touches at a plurality of points, and after that, a touch at only one point is detected, and when the touch at one point satisfies the predetermined condition, and after that, the touch at one point leaves the display screen while moving on the display screen, control such that the display object is scrolled after the touch at one point leaves the display screen, and (d) providing, when the touch detection unit detects touches at a plurality of points, and after that, a touch at only one point is detected, and when the touch at one point leaves the display screen without satisfying the predetermined condition, control such that the display object is not scrolled after the touch at one point leaves the display screen.

Accordingly, a sixth aspect of the present invention provides a non-transitory computer-readable storage medium storing a program for causing a computer to implement a control method for a control method for a display control apparatus having a display unit that has a display screen and a touch detection unit that is capable of detecting at least a touch at one point on the display screen, the control method comprising control step of (a) providing, when the touch detection unit detects a touch at one point, and after that, touches at a plural points are not detected until any touch at one point is not detected, control such that a plurality of items displayed on the display screen are scrolled in response to moving of a touch position of the touch at one point while the touch at one point is continuously detected, (b) providing control such that the plurality of items are scrolled after the touch at one point leaves the display screen in response to the touch at one point leaving the display screen while moving on the display screen, and (c) providing, when the touch detection unit detects touches at a plurality of points, and after that, a touch at only one point is detected, control such that an item to be selected is changed from a first item to a second item among the plurality of items in accordance with, without scrolling the plurality of items, a touch position of the touch at one point after the touch at one point satisfying a predetermined condition.

According to the present invention, incorrect operation against user's intent during multi-touch operation can be prevented.

Further features of the present invention will become apparent from the following description of exemplary embodiments (with reference to the attached drawings).

BRIEF DESCRIPTION OF THE DRAWINGS

FIG. 6 is a flowchart of a multi-touch process carried out in step S408 in FIG. 4.

FIGS. 7A to 7E are views showing changes of display when scrolling by dragging and momentum scrolling by flicking are done while an index display is provided on the display according to a second embodiment.

FIGS. 8A to 8G are views showing changes of display when the number of images to be displayed is changed and focus is moved by pinching while an index display is provided on the display according to the second embodiment.

DESCRIPTION OF THE EMBODIMENTS

The present invention will now be described in detail with reference to the drawings showing embodiments thereof. Here, a digital camera is taken up as a display control apparatus according to the present invention, but the present invention is not limited to this.

Figure 1A:
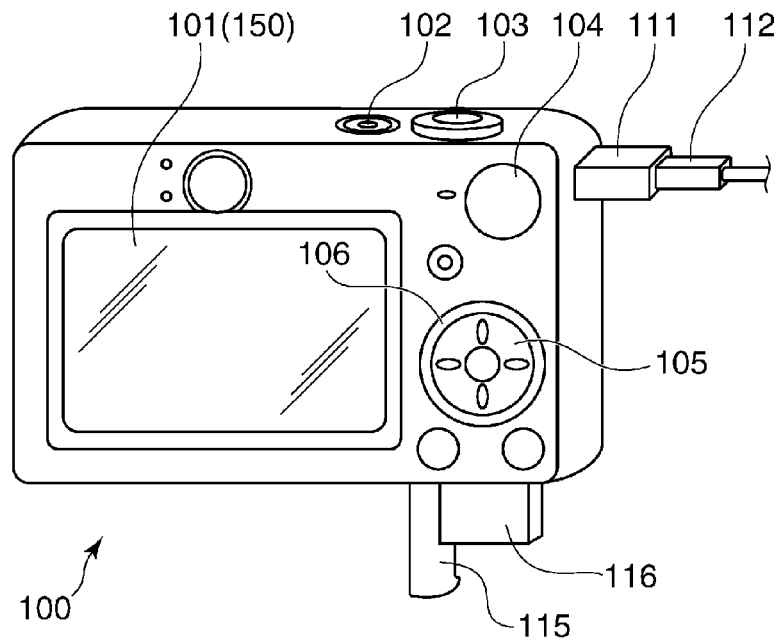
FIG. 1A is a perspective view showing an appearance of a digital camera according to embodiments of the present invention as viewed from a rear side.
Figure 1B:
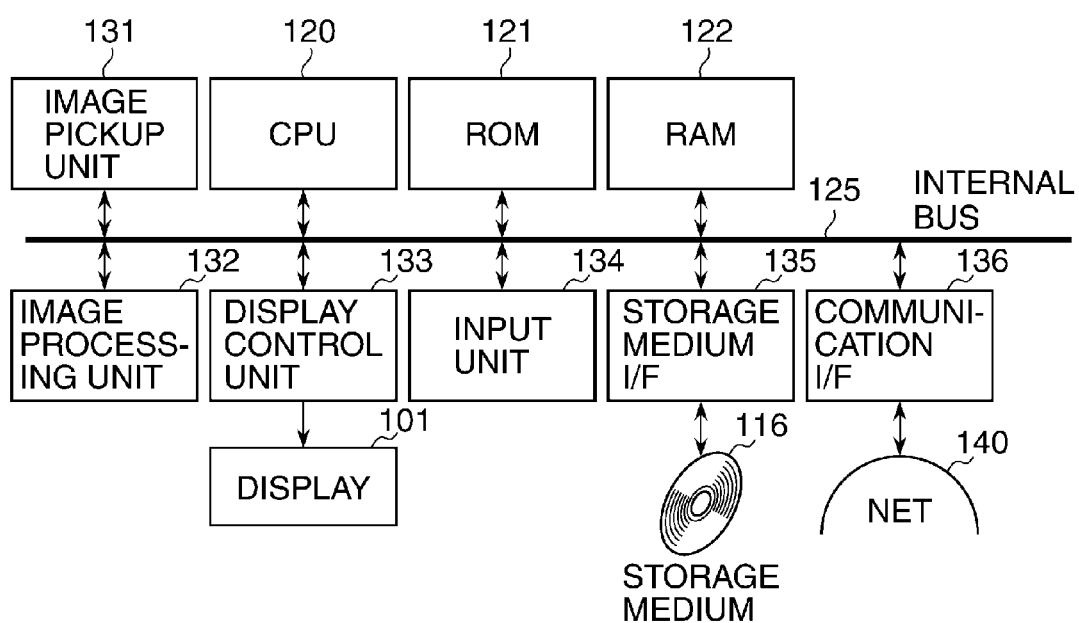
FIG. 1B is a block diagram schematically showing a hardware arrangement of the digital camera.

FIG. 1A is a perspective view showing an appearance of the digital camera 100 according to embodiments of the present invention as viewed from a rear side, and FIG. 1B is a block diagram schematically showing a hardware arrangement of the digital camera 100. Referring to FIG. 1A, the digital camera 100 has a display 101, a power switch 102, a shutter button 103, a mode dial 104, a cross key 105, and a controller wheel 106.

The display 101 is a display unit that displays various types of information such as taken images, operation menus, and setting information on the digital camera 100. A touch panel 150 is superimposed on the display 101. Not only a position of one point touched on the touch panel 150 can be detected, but also positions of a plurality of touch points can be detected at the same time. The power switch 102 selectively turns on and off power supply to a camera system of the digital camera 100.

The shutter button 103 issues instructions to carry out focusing and shooting of a subject. The mode dial 104 switches shooting modes (an automatic mode, an aperture priority mode, a shutter priority mode, a landscape mode, and a night scene mode). The cross key 105, which is a four-way button that receives various types of operations from a user, is capable of operating in four directions, up, down, right, and left. Here, the cross key 105 is configured as a single member, but four independent buttons disposed in a cross shape may be used as long as they indicate four directions.

The controller wheel 106, which is capable of being rotated, is used in conjunction with the cross key 105 to designate choice items or the like. When the controller wheel 106 is rotated, an electric pulse signal corresponding to the amount of operation (the angle of rotation or the number of rotations) is generated, and based on this pulse signal, a CPU 120 (see FIG. 1B) controls operations of components (such as drive units and processing units) constituting the digital camera 100. It should be noted that the controller wheel 106 may be any type as long as it is an operation member whose rotating operation can be detected, and for example, the controller wheel 106 may be a dial operation member that rotates itself in response to a rotational operation by the user and generates a pulse signal. The controller wheel 106 may also be an operation member which has a touch sensor and does not rotate itself but detects a rotating motion of a user's finger (fingertip) on the controller wheel 106 (touch wheel).

In the digital camera 100, a connection cable 112 and a communication I/F 136 (see FIG. 1B), which is provided on a main body of the digital camera 100, can be connected together via a connector 111. The digital camera 100 has a storage medium slot (not shown), in which a storage medium 116 such as a memory card is inserted, and the storage medium slot is openable and closable by a lid 115. It should be noted that the storage medium 116 inserted in the storage medium slot and the CPU 120 are able to communicate with each other via a storage medium I/F 135 (see FIG. 1B) provided on the main body of the digital camera 100.

Referring to FIG. 1B, the digital camera 100 has an internal bus 125, the CPU 120 connected to the internal bus 125, a ROM 121, and a RAM 122. An image pickup unit 131, an image processing unit 132, a display control unit 133, an input unit 134, the storage medium I/F 135, and the communication I/F 136 are connected to the internal bus 125. The units connected to the internal bus 125 exchange data with each other via the internal bus 125.

Various type of programs such as programs for controlling the overall operation of the digital camera 100 and operation of drive units and programs for carrying out image processing and others, data required to execute programs, and so on are stored in the ROM 121. The RAM 121 holds image data of taken images and others and is used as a work area for the CPU 120. Some functions of the ROM 121 and the RAM 122 may be performed by a hard disk (HD). The CPU 120 expands programs stored in the ROM 121 into the work area of the RAM 122. As a result, the operation of the units of the digital camera 100 is controlled.

The image pickup unit 131, which has a taking lens, an image pickup device such as a CCD or a CMOS, and so on, causes reflected light from a subject to form an optical image and then converts the optical image into an electric signal. The image processing unit 132 subjects image data such as moving images and still images taken by the image pickup unit 131 to pixel interpolation, a development process, a color process, a reducing process, an encoding process, a compression process, and so on, and stores resulting image data as an image file in the storage medium 116. The image processing unit 132 also subjects an image file (image data), which is read from the storage medium 116 or the like, to various types of processes (an expansion process, a decoding process, a color process, resizing, and so on) for displaying an image on the display 101. It should be noted that an electronic viewfinder function (through-the-lens display) is realized by converting image signals (analog signal) taken by the image pickup unit 131 into digital signals, accumulating them in the RAM 122, converting the accumulated digital signals again into analog signals, which in turn are successively transferred to and displayed on the display 101.

The input unit 134 receives user operations, generates control signals according to the operations, and supplies the control signals to the CPU 120. The touch panel 150, the power switch 102, the shutter button 103, the mode dial 104, the cross key 105, and the controller wheel 106 are included in the input unit 134. Based on control signals supplied from the input unit 134, the CPU 120 controls operation of the units in the digital camera 100 in accordance with predetermined programs. Thus, the digital camera 100 can be caused to operate in accordance with user operations.

The touch panel 150 can be integrated with the display 101. For example, the touch panel 150, which is configured to have such light transmissibility as not to obstruct view on the display 101, is attached to an upper layer of a display surface of the display 101. Then, input coordinates of the touch panel 150 and display coordinates on the display 101 are associated with each other. This configures a GUI that looks as if the user has directly operated objects displayed on the display 101.

The display control unit 133 is supplied with an image display control signal, which is generated by the CPU 120 in accordance with a program, generates a display signal based on the received image display control signal, and outputs the display signal to the display 101. As a result, an image is displayed on the display 101. The display control unit 133 also displays a GUI screen constituting a GUI (graphical user interface) on the display 101 based on the display control signal generated by the CPU 120.

With the storage medium 116 such as a memory card being inserted in the storage medium slot, the storage medium interface (I/F) 135 reads and write image data and others from and into the storage medium 116 under the control of the CPU 120. The communication interface (I/F) 136 carries out communications with external devices connected via the communication I/F 136, and a network 140 such as a LAN or the Internet under the control of the CPU 120.

Operations (1) to (5) below can mainly be performed on the touch panel 150. Namely, the CPU 120 is capable of detecting operations or states (1) to (5) below on the touch panel 150.

(1) A finger (fingertip) or a pen (pen tip) touches the touch panel 150 (hereafter referred to as "touch-down")

(2) A finger or a pen is kept in contact with the touch panel 150 (hereafter referred to as "touch-on")

(3) A finger or a pen is moving on the touch panel 150 while being kept in contact with the touch panel 150 (hereafter referred to as "move")

(4) A finger or a pen having been in contact with the touch panel 150 is released from the touch panel 150 (hereafter referred to as "touch-up")

(5) Nothing is touching the touch panel 150 (hereafter referred to as "touch-off")

Coordinates of a position touched by a finger or a pen on the touch panel 150, a position from which a finger or a pen has been released, or a position with which a finger or a pen is in contact by the above operations are posted to the CPU 120 through the internal bus 125. The CPU 120 determines what type of operation has been performed on the touch panel 150 based on the posted information. It should be noted that for a move operation, the CPU 120 determines a vertical component (a vertical direction of the screen in FIG. 1A) and a horizontal component (a horizontal direction of the screen in FIG. 1A) based on a change in coordinates of a position touched by a finger or a pen moving on the touch panel 150. As a result, a moving direction of a finger or a pen moving on the touch panel 150 can be obtained.

A sequential operation comprised of touch-down on the touch panel 150, predetermined move, and touch-up is referred to as "stroke", and quick stroke is referred to as "flick". Flick is an operation in which a finger is quickly moved to some extent while being in contact with the touch panel 150, and then the finger is released from the touch panel 150, and in other words, an operation in which a finger is flicked at a surface of the touch panel 150.

In the present embodiment, when move over a predetermined distance determined in advance or longer and at a predetermined speed determined in advance or higher is detected, and touch-up is detected in this state, it is determined that a flicking operation has been performed. When move over the predetermined distance or longer and at the predetermined speed lower than the predetermined speed is detected, it is determined that an operation generally called a "dragging" operation has been performed.

An operation in which two points (two places) are touched on the touch panel 150 at the same time, decreasing the distance between the two points, and then touch-up is performed is referred to as "pinch-in". Namely, pinch-in is an operation in which fingers being kept in contact with two points on the touch panel 150 are brought closer to each other, and then the fingers are released from the touch panel 150. In other words, pinch-in is an operation in which two fingers are moves along the touch panel 150 as if the fingers have pinched an object such as an image displayed under the touch panel 150. Contrary to pinch-in, an operation in which two points are touched by fingers or pens, the distance between the two points is increased, and then touch-up is performed is referred to as "pinch-out".

It should be noted that the touch panel 150 may be any type of the following, a resistive type, a capacitance type, a surface acoustic wave type, an infrared type, an image recognition type, and an optical sensor type as long as a plurality of touch points can be detected at the same time.

A description will now be given of an example in which an image displayed on the display 101 is enlarged as an example of operations according to the first embodiment. Here, a description will be given of how an image changes with reference to FIGS. 2A to 3E.

FIGS. 2A to 2D are views showing how a displayed image changes when scrolling by dragging and momentum scrolling by flicking are performed on an enlarged image displayed on the display 101. It should be noted that "scrolling" means that the entire image moves on the display 101, and "momentum scrolling" means that the entire image scrolling on the display 101 slows down and eventually stops.

Figure 2A:
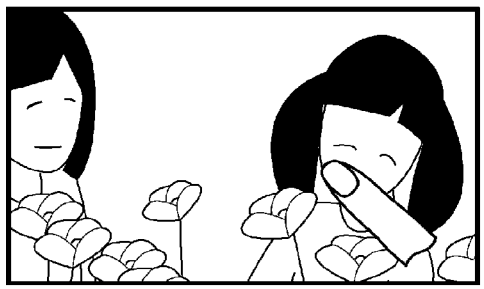
FIGS. 2A to 2D are views showing how a displayed image changes when scrolling by dragging and momentum scrolling by flicking are performed on an enlarged image displayed on a display according to a first embodiment.
Figure 2B:
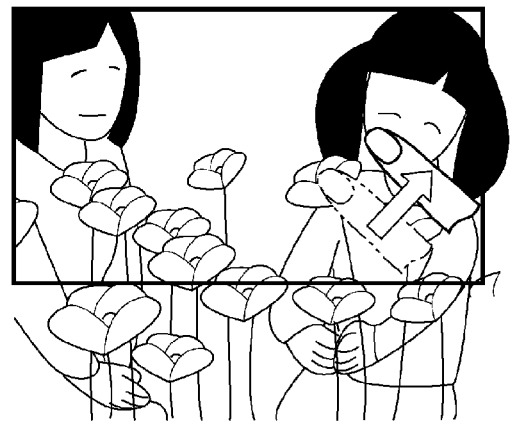

FIG. 2A shows a state in which touch-down is done at one point on the touch panel 150 when an enlarged image is displayed on the display 101, that is, when a part of the entire image is enlarged. It should be noted that a touch point is a fingertip (mainly, a position of a nail), and in FIGS. 3A to 3E and 7A to 8G, referred to later, as well, it is assumed that a touch point is a fingertip. FIG. 2B shows a state in which the enlarged image is scrolled from the lower left to the upper right by dragging to the upper right in the state shown in FIG. 2A. This scrolling changes the range (area) of the enlarged image displayed on the display 101.

Figure 2C:
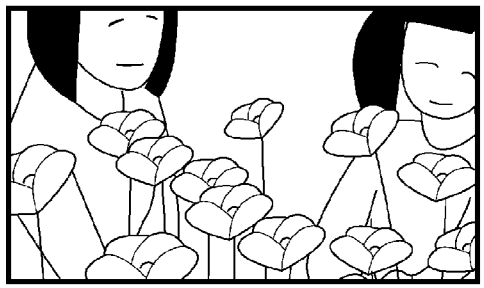
Figure 2D:
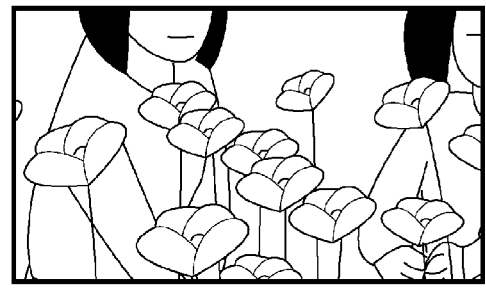

FIG. 2C shows a state in which touch-up is performed at the touch point touched in the state shown in FIG. 2B, and momentum scrolling of the enlarged image is occurring. Referring to FIG. 2C, because a flick to the upper right is detected, touch-up is performed, but momentum scrolling of the displayed image from the lower left to the upper right is occurring. FIG. 2D shows a state in which momentum scrolling in FIG. 2C ends to stop the display image, and as compared to FIG. 2B showing the state before the touch-up, the range (area) of the enlarged image displayed on the display 101 has changed.

Figure 3A:
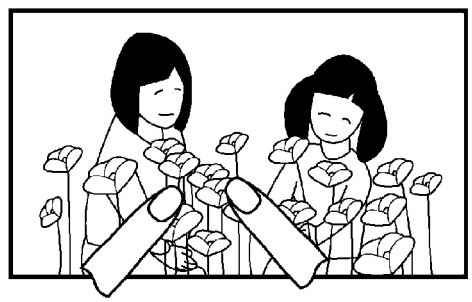
FIGS. 3A to 3E are views showing how a display image changes when an image displayed on the display according to the first embodiment is pinched to change enlargement factor.
Figure 3B:
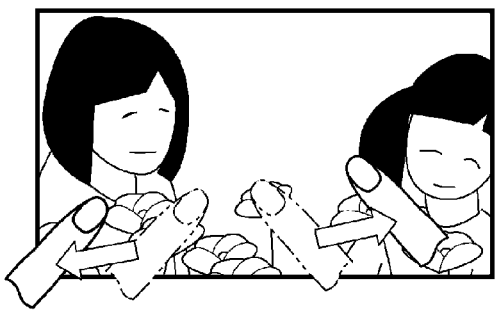

FIGS. 3A to 3E are views showing how a display image changes when an image displayed on the display 101 is pinched to change enlargement factor. FIG. 3A shows a state in which touch-down is performed at two points on the touch panel 150 when the entire image is displayed on the display 101. FIG. 3B shows a state in which due to pinching-out in the state shown in FIG. 3A, the image is enlarged. This pinching-out causes a part of the image, not the entire image, to be enlarged and displayed on the display 101.

Figure 3C:
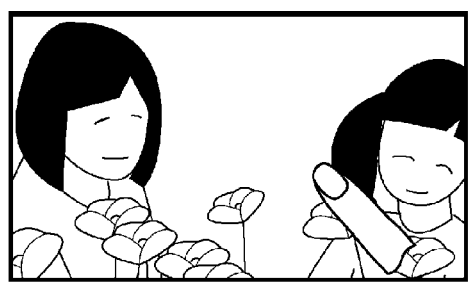
Figure 3D:
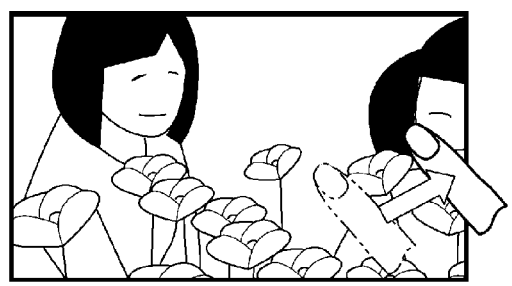
Figure 3E:
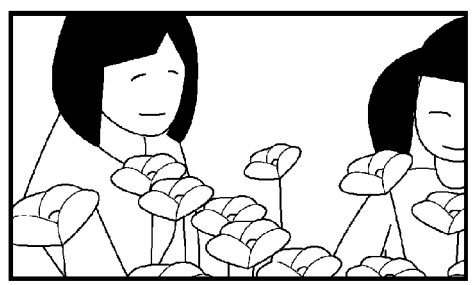

FIG. 3C shows a state in which only touch-up is performed at only one point in the state shown in FIG. 3B. FIG. 3D shows a state in which the remaining one point in the state shown in FIG. 3C is dragged. Due to this dragging operation, the displayed image is scrolled, and hence an area different from that in FIG. 3C is displayed in FIG. 3D. FIG. 3E shows a state in which in the state shown in FIG. 3D, touch-up is performed at the remaining one point, causing the displayed image to stop.

In the present embodiment, momentum scrolling is not performed when the moving amount of the touch point finally touched-up (the touch point in FIG. 3D) (the distance regarding the touch point remaining after the number of touch points is reduced from two to one from the position at which the number of touch points is reduced from two to one to the position at which touch-up is done) is short. As a result, momentum scrolling against user's intent is restrained so as not to greatly change a displayed image.

It should be noted that although in FIGS. 3A to 3E, an example in which an image is enlarged by pinch-out is taken up, similarly to this, momentum scrolling can be restrained in a case where an image is reduced by pinch-in. Moreover, as an alternative to the method using the moving amount as a reference, momentum scrolling may be restrained when a time period from a time at which the number of touch points is reduced from two to one to a time at which touch up is performed at the remaining one point (touch duration) is shorter than a predetermined time period. Moreover, although in the first embodiment, only momentum scrolling is restrained, scrolling by dragging may also be restrained. In this case, when the moving amount of a touch point remaining after the number of touch points is reduced from two to one is smaller than a predetermined amount, scrolling is not performed, and when the moving amount is equal to or greater than the predetermined amount, restraint on scrolling is canceled.

Referring next to flow charts of FIGS. 4 to 6, a description will be given of the procedure of a process that realizes the operations described above with reference to FIGS. 2A to 3E. Processes in FIGS. 4 to 6 are realized by the CPU 120 expanding programs stored in the ROM 121 into the work area of the RAM 122 and executing the same to control the units of the digital camera 100.

Figure 4:
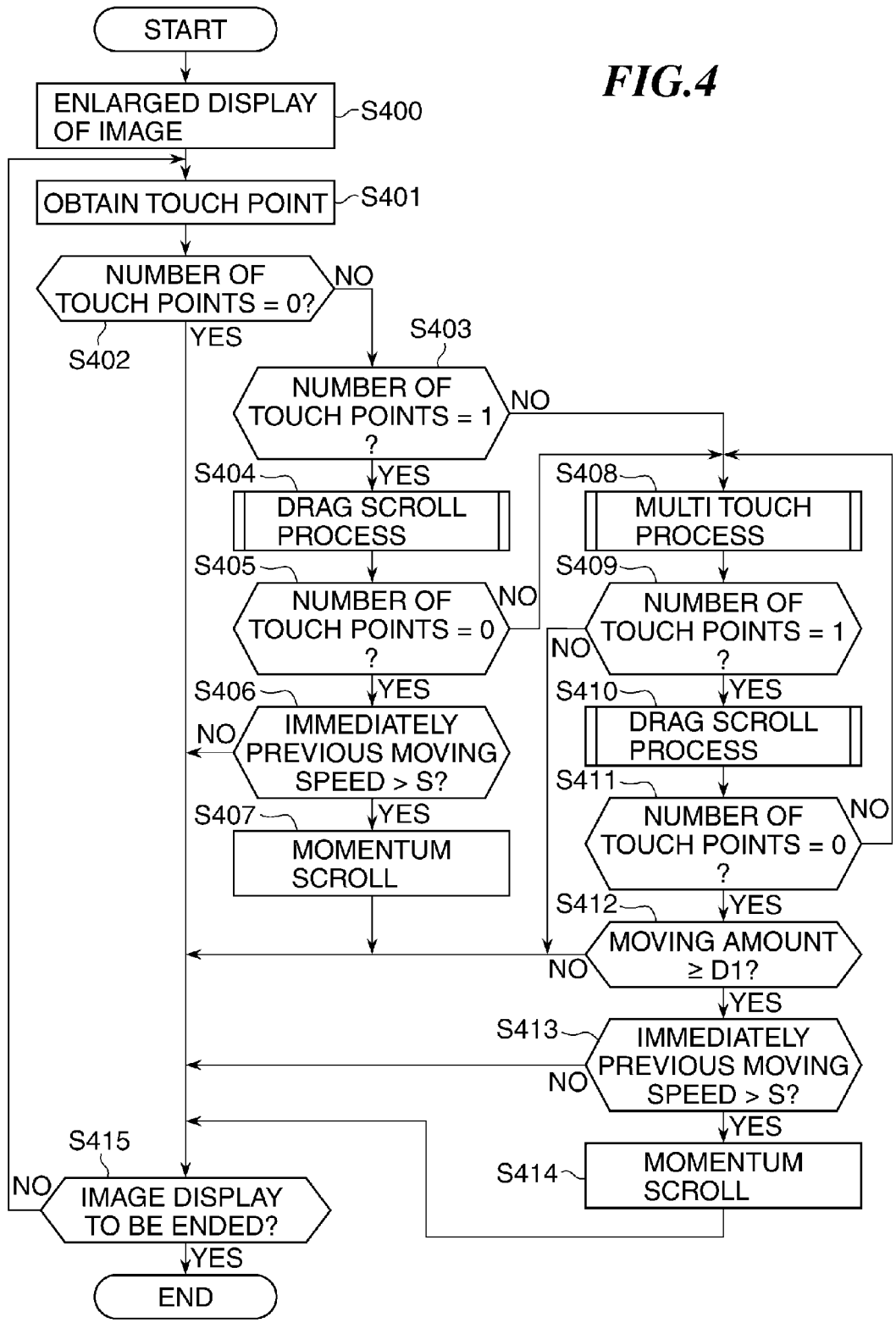
FIG. 4 is a flowchart of how image display is controlled when touch input on a touch panel is done in a state in which an enlarged image is displayed on the display according to the first embodiment.
Figure 5:
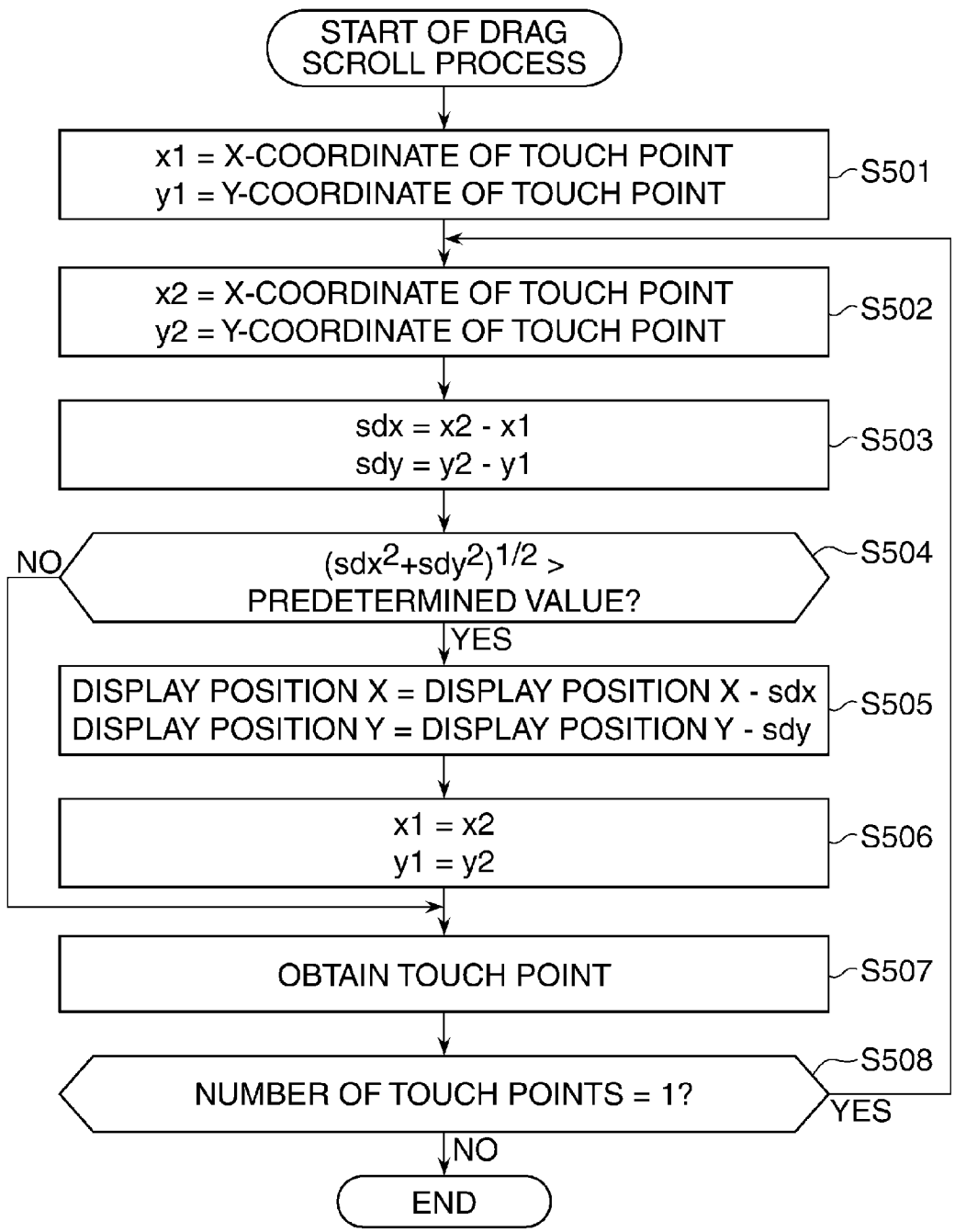
FIG. 5 is a flowchart of a drag scroll process carried out in steps S404 and S410 in FIG. 4.

FIG. 4 is a flowchart of how image display is controlled when touch input on the touch panel 150 is done in a state in which an enlarged image is displayed on the display 101. First, in step S400, the CPU 120 reads image data from the storage medium 116 and displays an image on the display 101. Here, a description is given of an example in which move by touch at one point is determined as dragging, and the displayed image is scrolled, and hence for the sake of convenience, it is assumed that an enlarged image is displayed in the step S400. Thus, in the step S400, the image as shown in FIG. 2A is displayed.

Next, in step S401, the CPU 120 detects a touch operation performed on the touch panel 150 and obtains coordinates of a touch point (touch point detection step). When two points are touched, coordinates of the two touch points are obtained. Then, in step S402, the CPU 120 determines whether or not the number of touch points is zero (0), that is, whether or not the touch panel 150 is in the touch-off state. When the CPU 120 determines that the touch panel 150 is in the touch-off state (YES in the step S402), the process proceeds to step S415, and when the CPU 120 determines that the touch panel 150 is not in the touch-off state (NO in the step S402), the process proceeds to step S403.

In the step S403, the CPU 120 determines whether or not the number of touch points is one. When the number of touch points is one (YES in the step S403), the process proceeds to step S404, and when the number of touch points is not one (NO in the step S403), the process proceeds to step S408.

In the step S404, the CPU 120 carries out a drag scroll process (a process to scroll a displayed image by dragging it), and thereafter, the process proceeds to step S405. It should be noted that detailed description will be given later of the process in the step S404 with reference to FIG. 5.

In the step S405, the CPU 120 determines whether or not the number of touch points is zero (0), that is, touch-up has been done (touch-up detection step). The determination in the step S405 is made with respect to the touch point obtained in the step S404. When the CPU 120 determines that touch-up has not been done (NO in the step S405), the process proceeds to the step S408, and when the CPU 120 determines that touch-up has been done (YES in the step S405), the process proceeds to step S406.

In the step S406, the CPU 120 determines whether or not a moving speed (immediately previous moving speed) immediately before touch-up at the touch point for which it was determined in the step S405 that touch-up has been done is higher than a predetermined speed S determined in advance. When the CPU 120 determines that the immediately previous moving speed is higher than the predetermined speed S (YES in the step S406), the process proceeds to step S407, and when the CPU 120 determines that the immediately previous moving speed is equal to or lower than the predetermined speed S (NO in the step S406), the process proceeds to step S415.

In the step S407, the CPU 120 performs momentum scrolling of the displayed image, and then the process proceeds to the step S415. Here, momentum scrolling is performed in accordance with laws of physics, and hence a moving position can be expressed by [Equation 1] and [Equation 2] below.

$$X = vx \times t + 1/(2 \times a \times t2) \quad \text{[Equation 1]}$$

$$Y = vy \times t + 1/(2 \times a \times t2) \quad \text{[Equation 2]}$$

where
X: display position in the direction of the X-axis
Y: display position in the direction of the Y-axis
vx: flick speed in the direction of the X-axis
vy: flick speed in the direction of the Y-axis
a: acceleration (predetermined value (negative value because speed is reduced))
t: time that elapses after touch-up The number of touch points in the case where it is determined that the number of touch points is not one in the step S403, and the process proceeds to the step S408 is two. Also, in the case where the number of touch points is one in the process in the step S404, the process in the step S404 is not brought to an end, and hence the number of touch points when the process proceeds from the step S405 to the step S408 is two. Thus, in the step S408, the CPU 120 carries out a multi-touch process. It should be noted that the process in the step S408 will be described later in detail with reference to FIG. 6.

In step S409 after completion of the step S408, the CPU 120 determines whether or not the number of points is one. The determination in the step S409 is made with respect to the touch point obtained in the step S408. When the CPU 120 determines that the number of touch points is one (YES in the step S409), the process proceeds to step S410, in which the CPU 201 carries out a drag scroll process and then proceeds to step S411. On the other hand, when the number of touch points is two in the process in the step S408, the process in the step S408 is not brought to an end, and hence the number of touch points when the number of touch points in the step S409 is not one is zero (0), which means that the touch panel 150 is in the touch-off state. For this reason, when the CPU 120 determines in the step S409 that the number of touch points is not one (NO in the step S409), the process proceeds to the step S415.

In the step S411, the CPU 120 determines whether or not the number of touch points is zero (0) (that is, whether or not touch-up is done at the touch point). The determination in the step S411 is made with respect to the touch point obtained in the step S410. When the CPU 120 determines that the number of touch points is zero (YES in the step S411), the process proceeds to step S412, and when the CPU 120 determines that the number of touch points is not zero (NO in the step S411), the process returns to the step S408. It should be noted that when the number of touch points is not one in the process in the step S410, the process in the step S410 is not brought to an end, and hence the number of touch points when it is determined in the step S411 that the number of touch points is not zero is two.

In the step S412, the CPU 120 determines whether or not a moving amount (moving distance) of the touch point, which remains after the number of touch points is reduced from two to one, from the position at which the number of touch points is reduced from two to one to the position at which touch-up is done is equal to or greater than a predetermined distance D1 determined in advance. When the CPU 120 determines that the moving amount is equal to or greater than the predetermined distance D1 (YES in the step S412), the process proceeds to step S413, and when the CPU 120 determines that the moving amount is smaller than the predetermined distance D1 (NO in the step S412), the process proceeds to the step S415.

In the step S413, the CPU 120 determines whether or not a moving speed (immediately previous moving speed) immediately before touch-up at the touch point is higher than a predetermined speed S determined in advance. When the CPU 120 determines that the immediately previous moving speed is higher than the predetermined speed S (YES in the step S413), the process proceeds to step S414, and when the CPU 120 determines that the immediately previous moving speed is equal to or lower than the predetermined speed S (NO in the step S413), the process proceeds to the step S415. In the step S414, the CPU 120 performs momentum scrolling of the displayed image, and thereafter, the process proceeds to the step S415.

In the step S415, the CPU 120 determines whether or not there has been an operation to terminate image display (for example, an operation to switch to a shooting mode, an operation to switch to another operation mode such as an instruction to display a menu screen, or an operation to turn off power supply). When the CPU 120 determines that there has been no terminating operation (NO in the step S415), the process returns to the step 410, and when the CPU 120 determines that there has been the terminating operation (YES in the step S415), the process is brought to an end.

FIG. 5 is a flowchart of the drag scroll process carried out in the steps S404 and S410. First, in step S501, the CPU 120 stores variables x1 and y1 for scroll control as an X-coordinate and a Y-coordinate of a touch point in the RAM 122. Next, in step S502, the CPU 120 stores variables x2 and y2 (which represent the present touch point) for scroll control as an X-coordinate and a Y-coordinate of a touch point in the RAM 122. Then, in step S503, the CPU 120 obtains variables sdx and sdy (differences between the touch points in the directions of the X-axis and the Y-axis) for scroll control as a difference between the variable x2 and the variable x1 and a difference between the variable y2 and the variable y1, respectively (sdx=x2−x1, sdy=y2−y1).

Then, in step S504, the CPU 120 determines whether or not a distance between the two points (x1, y1) and (x2, y2) is greater than a predetermined distance determined in advance. When the CPU 120 determines that the distance between the two points is greater than the predetermined distance (YES in the step S504), the process proceeds to step S505, and when the CPU 120 determines that the distance between the two points is equal to or smaller than the predetermined distance (NO in the step S504), the process proceeds to step S507. In the step S505, the CPU 120 subtracts the variables sdx and sdy from display positions X and Y, respectively, and updates display positions which are scroll positions. Namely, the displayed image is scrolled in the direction of the X-axis and the direction of the Y-axis. Thereafter, in step S506, the CPU 120 changes the variable x2 to the variable x2 and changes the variable y1 to the variable y2 and the process proceeds to the step S507.

In the step S507, the CPU 120 obtains a touch point again. Then, in step S508, the CPU 120 determines whether or not the number of touch points is one. When the CPU 120 determines that the number of touch points is one (YES in the step S508), the process returns to the step S502, and when the CPU 120 determines that the number of touch points is not one (NO in the step S508), the process is brought to an end.

FIG. 6 is a flowchart of the multi-touch process carried out in the step S408. First, in step S601, the CPU 120 determines whether or not touch-down has been done at the second touch point. When the CPU 120 determines that touch-down has been done at the second touch point (YES in the step S601), the process proceeds to step S602, and when the CPU 120 determines that touch-down has not been done at the second touch point (NO in the step S601), the process proceeds to step S603.

In the step S602, the CPU 120 measures the distance between the two touch points, assigns it to a variable md1 for multi-touch control, stores the variable md1 in the RAM 122, and the process proceeds to the step S603. In the step S603, the CPU 120 sets the distance between the present two touch points as a variable md2 (which represents the distance between the present two points) for multi-touch control, stores the variable md2 in the RAM 122, and the process proceeds to step S604.

In the step S604, the CPU 120 determines whether or not a value obtained by subtracting the variable md1 from the variable md2 (difference A1=md2−md1) is equal to or greater than a predetermined value determined in advance. Namely, in the step S604, it is determined whether or not pinching-out is being performed. When the CPU 120 determines that the difference A1 is equal to or greater than the predetermined value (YES in the step S604), the CPU 120 determines that pinching-out is being performed, and the process proceeds to the step S605, and on the other hand, when the CPU 120 determines that the difference A1 is smaller than the predetermined value (NO in the step S604), the process proceeds to step S606.

In the step S605, the CPU 120 increases the enlargement factor for the image and updates the image display (enlarged display). In the step S606, the CPU 120 determines whether or not a value obtained by subtracting the variable md2 from the variable md1 (difference A2=md1−md2) is equal to or greater than a predetermined value determined in advance. Namely, in the step S606, it is determined whether or not pinching-in is being performed. When the CPU 120 determines that the difference A2 is equal to or greater than the predetermined value (YES in the step S606), the CPU 120 determines that pinching-in is being performed, and the process proceeds to the step S607, and on the other hand, when the CPU 120 determines that the difference A2 is smaller than the predetermined value (NO in the step S606), the process proceeds to step S609.

In the step S607, the CPU 120 decreases the enlargement factor for the image and updates the image display (reduced display), and the process proceeds to step S608. In the step S608, the CPU 120 changes the variable md1 to the variable md2. In the next step S609, the CPU 120 obtains a touch point again. Then, in step S610, the CPU 120 determines whether or not the number of touch points is two. When the CPU 120 determines that the number of touch points is two (YES in the step S610), the CPU 120 determines that no touch-up has been done and returns to the step S603, and when the CPU 120 determines that the number of touch points is not two (NO in the step S610), the process is brought to an end.

The above described processes following the flowcharts of FIGS. 4 to 6 can realize an operation to move a displayed image as described with reference to FIGS. 2A to 3E.

In the above description of the first embodiment, display control associated with enlargement/reduction and scrolling of one image has been taken up, whereas a second embodiment relates to display control associated with touch operation when a plurality of predetermined items are index displayed (multi displayed). Images are taken up as the predetermined items. It should be noted that the first embodiment and the second embodiment relate to display control provided in different scenes using the same display control apparatus (namely, the digital camera 100 which is one example).

More specifically, the following description of the second embodiment is given of how display is controlled when a plurality of images are index displayed on the display 101, and the user operates the touch panel 150 to scroll the images, change the number of pages, and move focus.

In index display according to the second embodiment, a plurality of images are arranged in a matrix. Also, in index display, images are arranged in a predetermined order such as order of image file name, order of image number, order of shooting date and time from the left end to the right end of a certain row and then from the left end to the right end of the next row. When all images cannot be displayed on one screen, images arranged in the previous or subsequent row can be displayed by scrolling the screen. Further, when scrolling stops, a focus frame is superimposed on a selected image so that the image can easily be distinguished from unselected images.

It should be noted that operation of a zoom lever included in the input unit 134 can switch to display of a single image selected with a focus frame and enlarge the image. Moreover, depression of a delete button or a protect button included in the input unit 134 can delete or protect an image selected with a focus frame. The number of images (the number of rows and the number of columns) that can be displayed in index display is changeable through user operation, and the size of each image decreases as the number of images to be displayed at a time is increased.

Figures 7A, 7B, 7C, 7D, 7E:
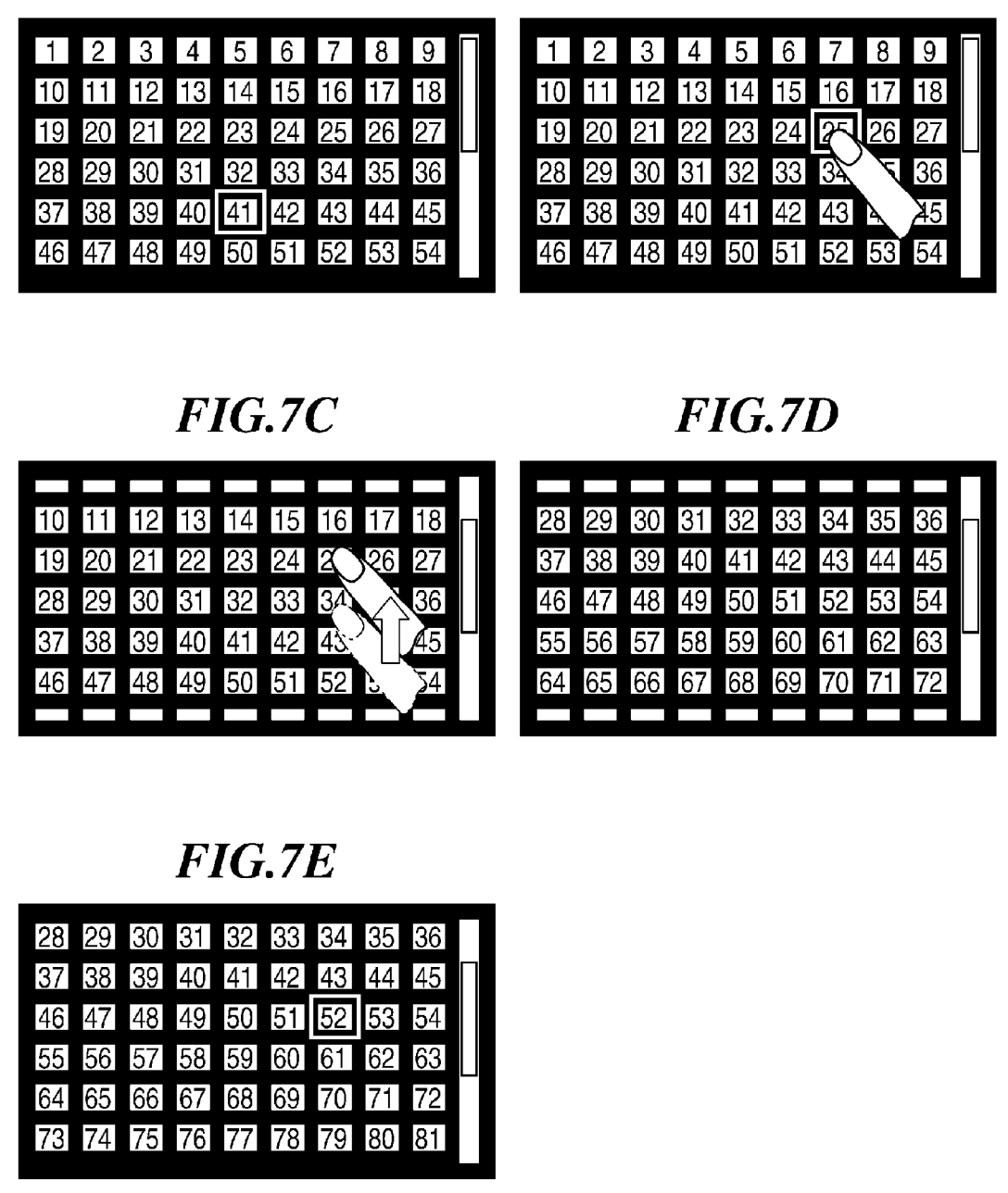

FIG. 7A to 7E are views showing changes of display when scrolling by dragging and momentum scrolling by flicking are done while an index display is provided on the display 101. FIG. 7A shows an exemplary index display in a static state before scrolling, and a focus frame is displayed on an image 41. FIG. 7B shows a state in which touch-down is done at one point in the state shown in FIG. 7A, and this touch-down moves the focus frame to an image 25 including the touch point.

FIG. 7C shows a state in which as a result of upward dragging in the state shown in FIG. 7B, displayed images are changing from an upper part (images with smaller numbers) toward a lower part (images with larger numbers). Namely, as compared to FIG. 7B, all the images are scrolled upward in FIG. 7C. It should be noted that during scrolling, the focus frame is hidden.

FIG. 7D shows a state in which touch-up is done at the touch point in the state in FIG. 7C, and momentum scrolling is performed. Referring to FIG. 7D, upward flicking is detected, and hence momentum scrolling from bottom toward top. Thus, as compared to FIG. 7C, a different image group is being displayed in FIG. 7D. FIG. 7E shows a stopped state in which momentum scrolling has ended after the state shown in FIG. 7D. When momentum scrolling stops, the focus frame is displayed again, and in FIG. 7E, the focus frame is displayed on an image 52. It should be noted that coordinates of the image 52 on the display 101 are the same as those of the image 25 appearing in FIG. 7B.

Figures 8A, 8B, 8C, 8D, 8E, 8F, 8G:
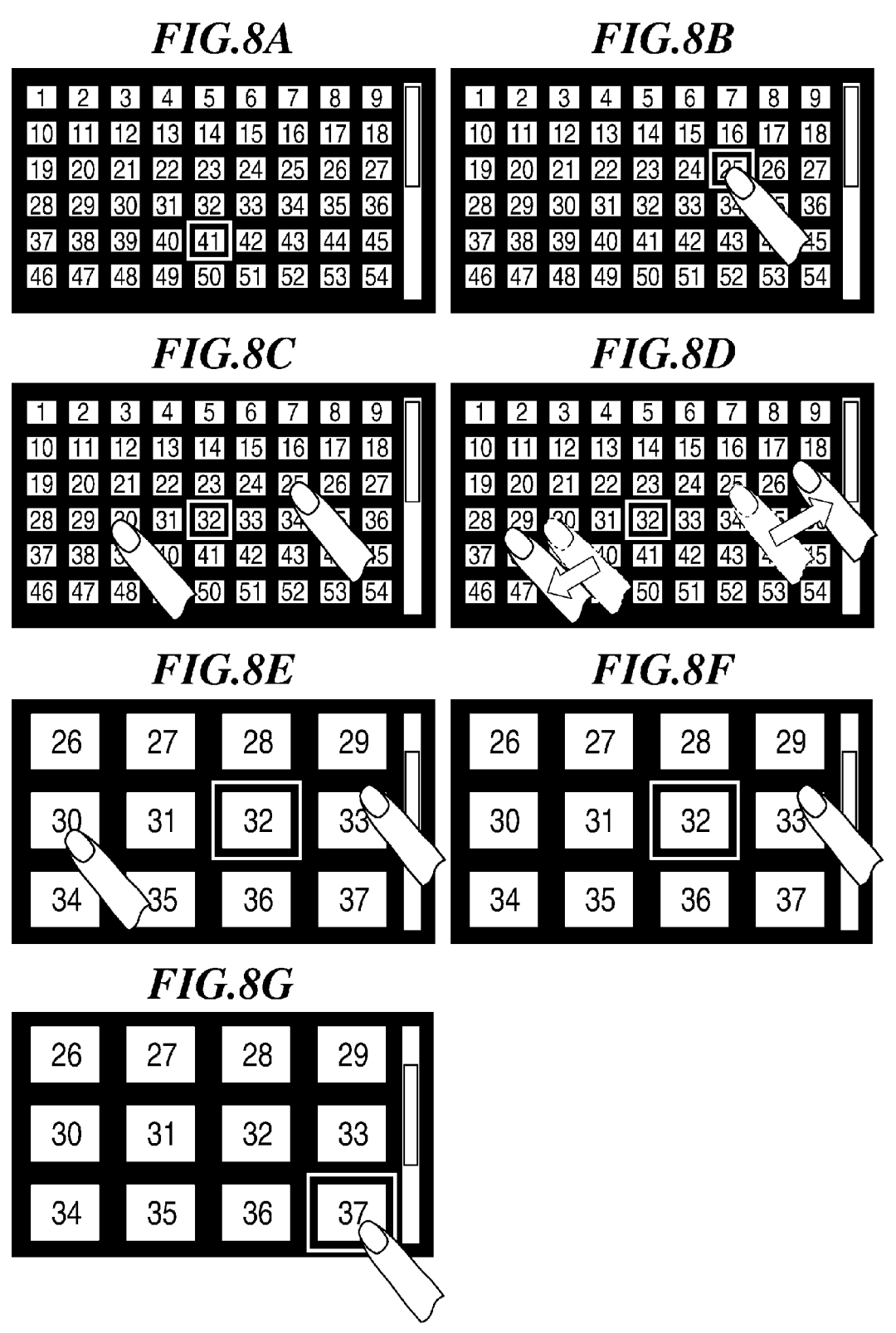

FIGS. 8A to 8G are views showing changes of display when the number of images to be displayed is changed and focus is moved by pinching while an index display is provided on the display 101. FIG. 8A shows the same state as in FIG. 7A, that is, the state in which scrolling has stopped in the touch-off state. FIG. 8B shows a state in which touch-down is done at one point in the state shown in FIG. 8A, and a focus frame is displayed on an image 25 at which touch-down has been done. FIG. 8C shows a state in which touch-down is done at other one point in the state shown in FIG. 8B, and here, the focus frame is moved to an image 32 including a midpoint between the two touch points.

FIG. 8D shows a state in which pinching-out is performed in the state shown in FIG. 8C. FIG. 8E shows an exemplary index display in a state in which the number of displayed images has decreased (from 7×6 to 4×3) due to pinching-out in the state in FIG. 8D. It should be noted that the focus frame is displayed in a manner being superimposed on the same image as the one before switching (here, the image 32). FIG. 8F shows a state in which touch-up has been done at one point (the touch point near an image 30) in the state shown in FIG. 8E.

FIG. 8G shows a state in which downward dragging is performed at one point remaining after the state shown in FIG. 8F, and the focus frame has been moved to an image including a touch point which is a dragging destination (here, an image 37). Thus, when move at one point is done without touch-off (the state in which no point is being touched) after pinching in index display, scrolling is not performed in response to the move, but only a focus frame is moved in response to the move. Therefore, as compared to FIG. 8F, FIG. 8G shows the position of the touch point (the position of the finger) has been changed, but there is no change in an image group being index-displayed.

Thus, because no scrolling operation is accepted until touch-off after pinching-out, a focus frame can be moved without losing track of a desired image. Moreover, when the moving amount in dragging is short, a focus frame is not moved neither so that incorrect operation against user's intent can be prevented. It should be noted that although in the example shown in FIGS. 8A to 8G, images are enlarged by pinching-out, the same display control is possible after images are reduced in size by pinching-in.

Referring now to flowcharts of FIGS. 9 to 12, a description will be given of the procedure of processes to realize the operation described with reference to FIGS. 7A to 8G. The processes in the flowcharts of FIGS. 9 to 12 are realized by the CPU 120 by expanding programs recorded in the ROM 121 into the work area of the RAM 122 and executing them to control the units in the digital camera 100.

Figure 9:
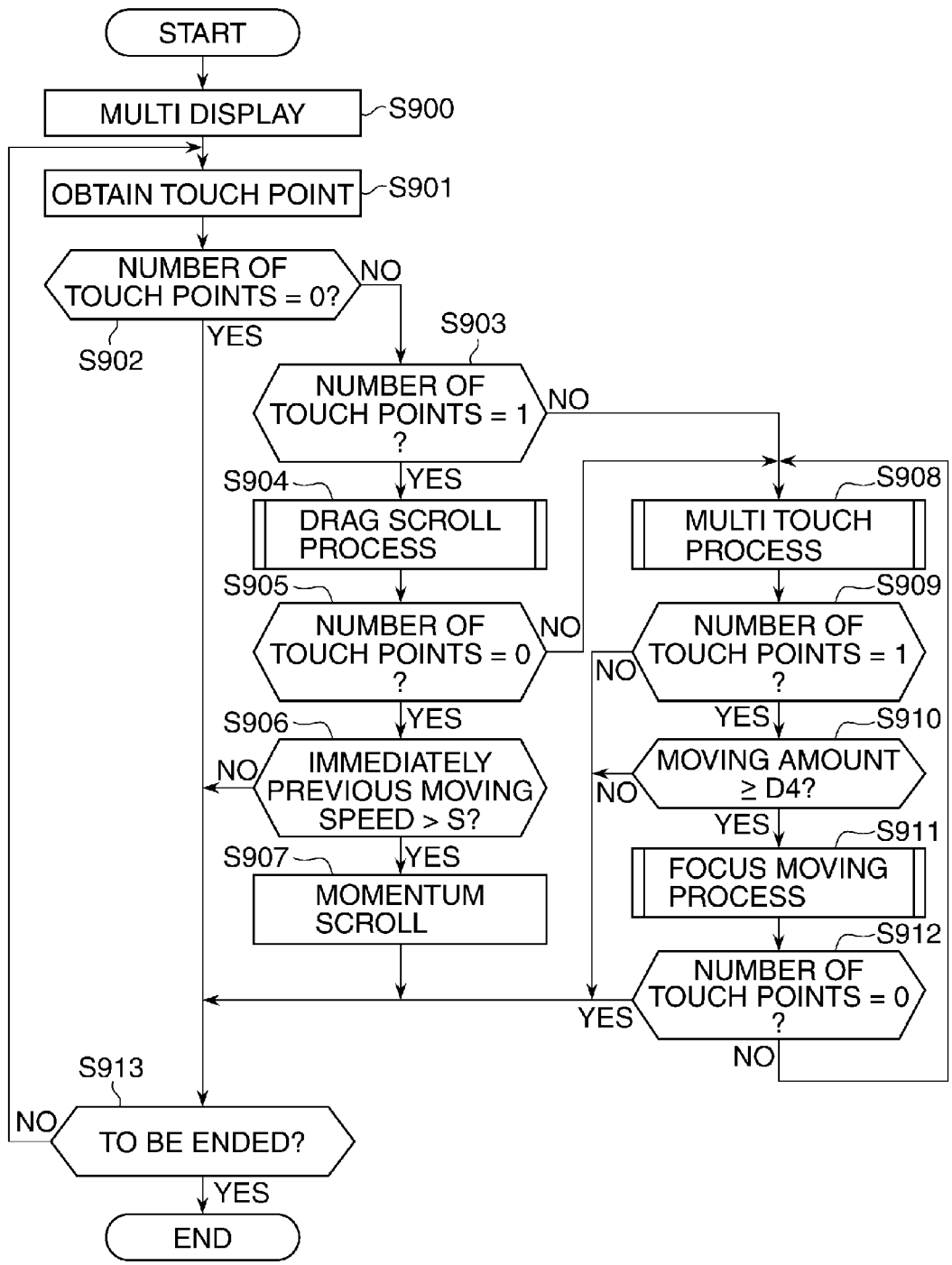
FIG. 9 is a flowchart of image display control in a case where touch input is done on the touch panel in a state in which an index display is provided on the display according to the second embodiment.

FIG. 9 is a flowchart of image display control in a case where touch input is done on the touch panel 150 in a state in which an index display is provided on the display 101. First, in step S900, the CPU 120 reads images from the recording medium 116 and produces an index display (multi display) on the display 101. As a result, a display as shown in FIGS. 7A and 8A referred to above is produced. Next, in step S901, the CPU 120 obtains coordinates of a touch point.

Then, in step S902, the CPU 120 determines whether or not the number of touch points is zero (0), that is, whether or not the touch panel 150 is in the touch-off state. When the CPU 120 determines that the touch panel 150 is in the touch-off state (YES in the step S902), the process proceeds to step S913, and when the CPU 120 determines that the touch panel

150 is not in the touch-off state (NO in the step S902), the process proceeds to step S903. In the step S903, the CPU 120 determines whether or not the number of touch points is one. When the CPU determines that the number of touch points is one (YES in the step S903), the process proceeds to step S904. On the other hand, when the CPU 120 determines that the number of touch points is not one (NO in the step S903), the process proceeds to step S908.

In the step S904, the CPU 120 carries out a drag scroll process. The drag scroll process in the step S904 will be described later in detail with reference to FIG. 10. Next, in step S905, the CPU 120 determines again whether or not the number of touch points is zero (0), that is, the touch panel 150 is in the touch-off state. The determination in the step S905 is made with respect to the touch point obtained in the step S904. When the CPU 120 determines that the touch panel 150 is in the touch-off state (YES in the step S905), the process proceeds to step S906, and when the CPU 120 determines that the touch panel 150 is not in the touch-off state (NO in the step S905), the process proceeds to the step S908.

In the step S906, the CPU 120 determines whether or not a moving speed (immediately previous moving speed) immediately before touch-up at the touch point when the touch panel 150 is brought into the touch-off state in the step S905 is higher than a predetermined speed S. When the CPU 120 determines that the immediately previous moving speed is higher than the predetermined speed S (YES in the step S906), the process proceeds to step S907, and when the CPU 120 determines that the immediately previous moving speed is equal to or lower than the predetermined speed S (NO in the step S906), the process proceeds to the step S913. In the step S907, the CPU 120 performs momentum scrolling and then proceeds to the step S913.

When the determination result is negative (NO) in the step S903, the number of touch points is two. When the number of touch points is one in the step S904, the process in the step S904 is not brought to an end, and hence when the determination result is negative (NO) in the step S905, the number of touch points is also two. Therefore, in the step S908, the CPU 120 carries out a multi touch process. It should be noted that the multi touch process in the step S908 will be described later in detail with reference to FIG. 11.

In step S909 after the step S908, the CPU 120 determines again whether or not the number of touch points is one. Here, because the process in the step S908 is not brought to an end when the number of touch points is two, and hence when it is determined in the step S909 that the number of touch points is not one, the number of touch points is zero (0), that is, the touch panel 150 is in the touch-off state. The determination in the step S909 is made with respect to the touch point obtained in the step S908. Therefore, when the CPU 120 determines that the number of touch points is one (YES in the step S909), the process proceeds to step S910, and when the CPU 120 determines whether or not the number of touch points is not one (NO in the step S909), the process proceeds to the step S913.

In the step S910, the CPU 120 determines whether or not a moving amount (moving distance) of the touch point, which remains after the number of touch points is reduced from two to one, is equal to or greater than a predetermined distance D4. When the CPU 120 determines that the moving amount is equal to or greater than the predetermined distance D4 (YES in the step S910), the process proceeds to step S911, and when the CPU 120 determines that the moving amount is smaller than the predetermined distance D4 (NO in the step S910), the process proceeds to the step S913. In the step S911, the CPU 120 carries out a focus moving process. It should be noted that the focus moving process in the step S911 will be described later in detail with reference to FIG. 12.

In step S912 after the step S911, the CPU 120 determines whether or not the number of touch points obtained in the step S911 is zero (0). Here, because the process in the step S911 is not brought to an end when the number of touch points is one, and hence when it is determined in the step S912 that the number of touch points is not zero, the number of touch points is two. Therefore, when the CPU 120 determines that the number of touch points is not zero (NO in the step S912), the process returns to the step S908. On the other hand, when the CPU 120 determines that the number of touch points is zero (YES in the step S912), the process proceeds to the step S913.

In the step S913, the CPU 120 determines whether or not there has been an operation to terminate index display (for example, an operation to switch to a shooting mode, an operation to switch to another operation mode such as an instruction to display a menu screen, or an operation to turn off power supply). When the CPU 120 determines that there has been no terminating operation (NO in the step S913), the process returns to the step S901, and when the CPU 120 determines that there has been the terminating operation (YES in the step S913), the process is brought to an end.

Figure 10:
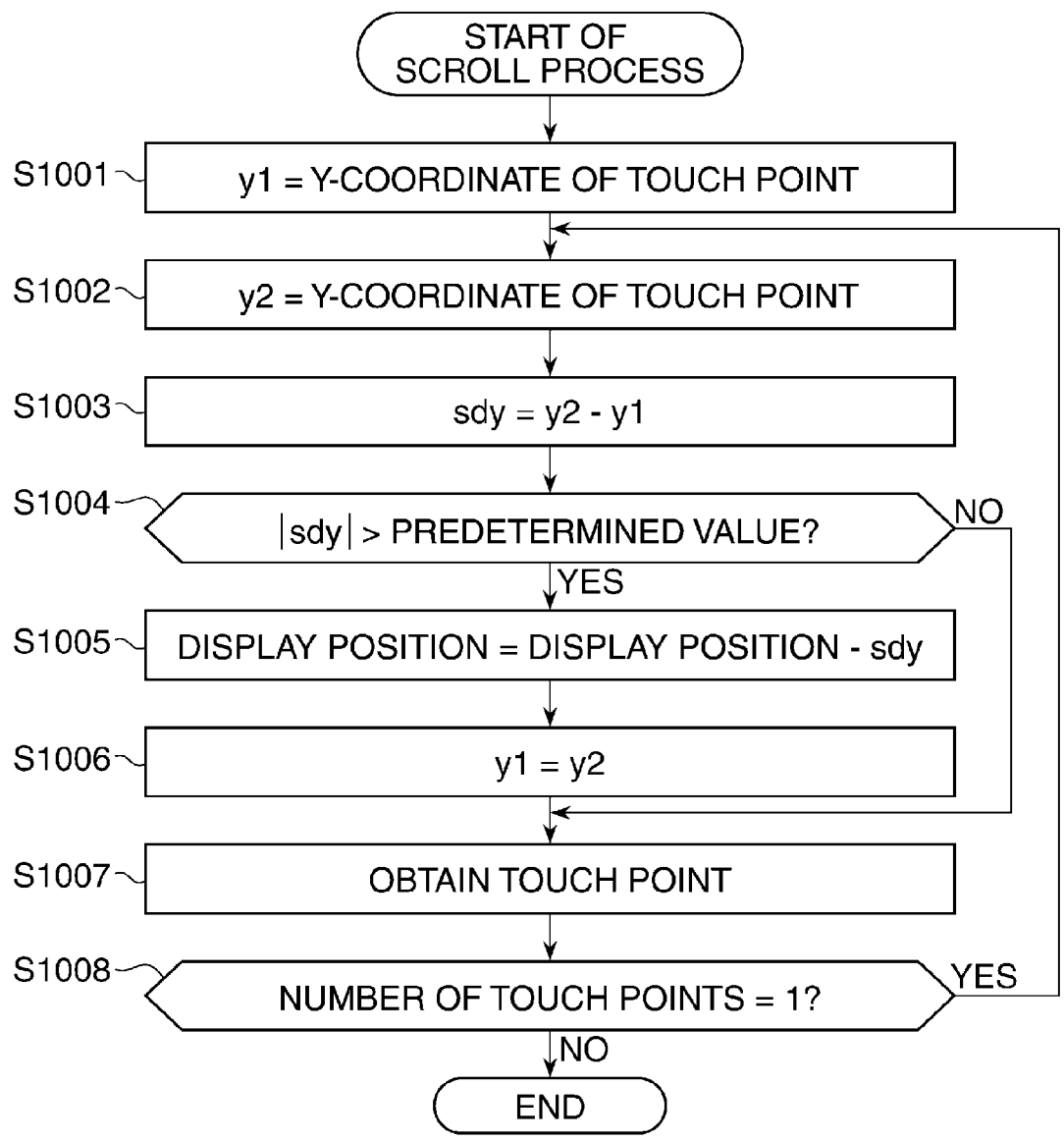
FIG. 10 is a flowchart of a drag scroll process carried out in step S904 in FIG. 9.

FIG. 10 is a flowchart of the drag scroll process carried out in the step S904. First, in step S1001, the CPU 120 assigns a Y-coordinate of the touch point to a variable y1 for scroll control and stores the variable y1 in the RAM 122. Next, in step S1002, the CPU 120 stores a variable y2 (which represents a y-coordinate of the present touch point) for scroll control as a Y-coordinate of a touch point in the RAM 122.

Then, in step S1003, the CPU 120 obtains a variable sdy (which represents a difference between the touch points in the directions of Y-axis) for scroll control as a difference between the variable y2 and the variable y1 (=y2−y1). In step S1004, CPU 120 then determines whether or not the absolute value of the variable sdy is greater than a predetermined value.

When the CPU 120 determines that the absolute value of the variable sdy is equal to or smaller than the predetermined value (NO in the step S1004), the process proceeds to step S1007, and when the CPU 120 determines that the absolute value of the variable sdy is greater than the predetermined value (YES in the step S1004), the process proceeds to step S1005.

In the step S1005, the CPU 120 subtracts the variable sdy from a display position and updates a display position at a scroll position. Namely, scrolling in the direction of the Y-axis is performed. Thereafter, in step S1006, the CPU 120 changes the variable y1 to the variable y2. In the next step S1007, the CPU 120 obtains a touch point again. Then, in step S1008, the CPU 120 determines whether or not the number of touch points is one. When the CPU 120 determines that the number of touch points is one (YES in the step S1008), the process returns to the step S1002, and when the CPU 120 determines that the number of touch points is not one (NO in the step S1008), the process is brought to an end.

Figure 11:
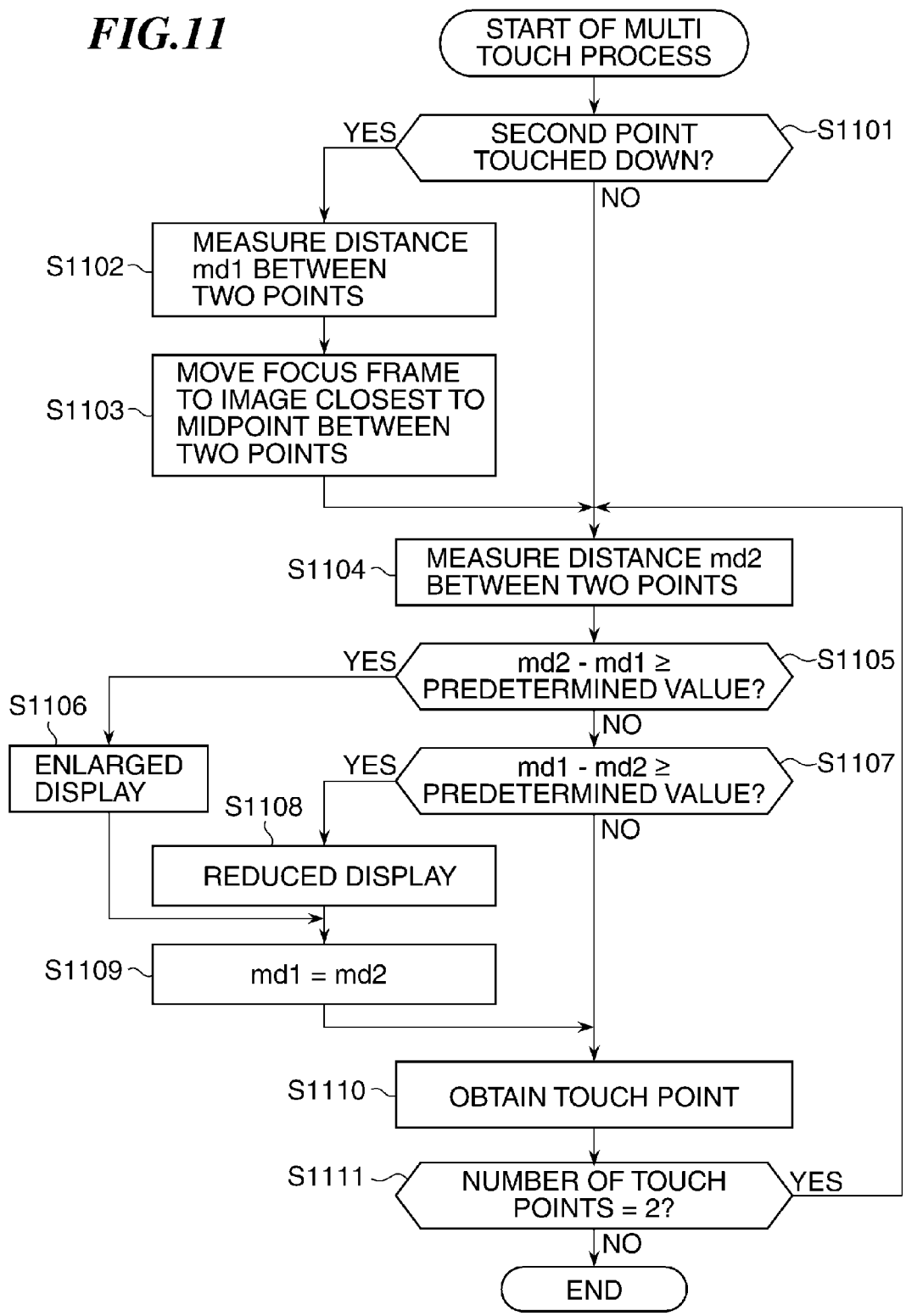
FIG. 11 is a flowchart of a multi-touch control process carried out in step S908 in FIG. 9.

FIG. 11 is a flowchart of the multi-touch control process carried out in the step S908. First, in step S1101, the CPU 120 determines whether or not touch-down has been done at the second touch point. When the CPU 120 determines that touch-down has been done at the second touch point (YES in the step S1101), the process proceeds to step S1102, and when the CPU 120 determines that touch-down has not been done at the second touch point (NO in the step S1101), the process proceeds to step S1104.

In the step S1102, the CPU 120 assigns the distance between the present two touch points to a variable md1 for multi-touch control, and stores the variable md1 in the RAM 122. Then, in the step S1103, the CPU 120 moves a focus image to an image closest to a midpoint between the two touch points. Thereafter, the process proceeds to step S1104.

In the step S1104, the CPU 120 assigns the distance between the present two touch points to a variable md2 (which represents the distance between the present two points) for multi-touch control, and stores the variable md2 in the RAM 122. In step S1105 after the step S1104, the CPU 120 determines whether or not a value (difference B1=md2−md1) obtained by subtracting the variable md1 from the variable md2 is equal to or greater than a predetermined value. Namely, in the step S1105, it is determined whether or not pinching-out is being performed. When the CPU 120 determines that the difference B1 is equal to or greater than the predetermined value (YES in the step S 1104), that is, when pinching-out is being performed, the process proceeds to step S1106, and on the other hand, when the CPU 120 determines that the difference B1 is smaller than the predetermined value (NO in the step S 1104), the process proceeds to step S1107.

In the step S1106, the CPU 120 carries out an enlarged display process in which it enlarges each image in size to reduce the number of images to be displayed on a screen, and after that, the process proceeds to step S1109. In the step S1107, the CPU 120 determines whether or not a value (difference B2=md1−md2) obtained by subtracting the variable md2 from the variable md1 is equal to or greater than a predetermined value, that is, whether or not pinching-in is being performed. When the CPU 120 determines that the difference B2 is equal to or greater than the predetermined value (YES in the step S1107), the CPU 120 determines that pinching-out is being performed and then the process proceeds to step S1108, and on the other hand, when the CPU 120 determines that the difference B2 is smaller than the predetermined value (NO in the step S 1107), the process proceeds to step S1110. In the step S1008, the CPU 120 carries out a reduced display process in which it reduces the size of each image to increase the number of images to be displayed on a screen. Then, in the step S1109, the CPU 120 changes the variable md1 to the variable md2. After that, the process proceeds to the step S1110.

In the step S1110, the CPU 120 obtains a touch point again. Then, in step S1111, the CPU 120 determines whether or not the number of touch points is two. When the CPU 120 determines that the number of touch points is two (YES in the step S1111), the process returns to the step S1104, and when the CPU 120 determines that the number of touch points is not two (NO in the step S1111), the process is brought to an end.

Figure 12:
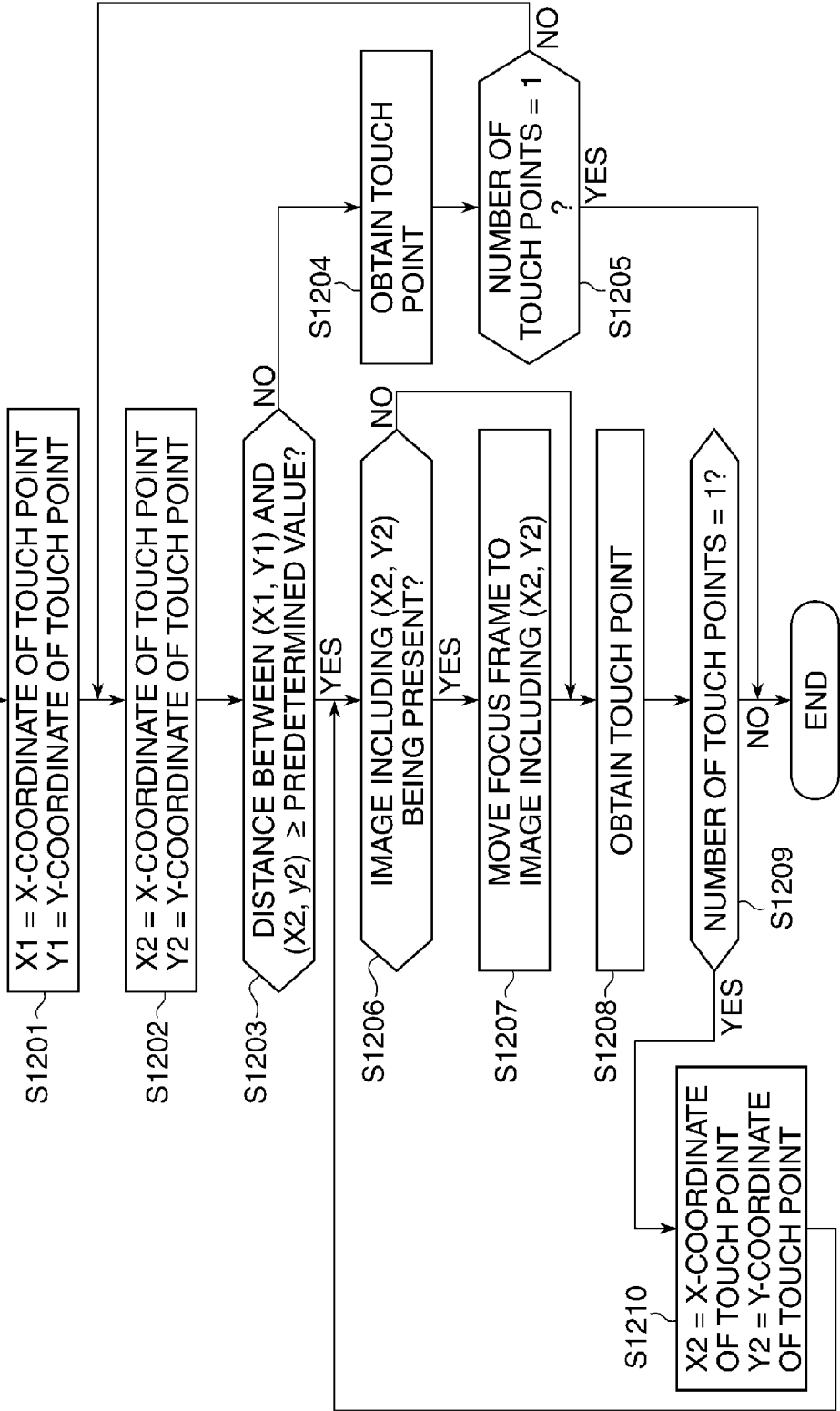
FIG. 12 is a flowchart of a multi-touch control process carried out in step S911 in FIG. 9.

FIG. 12 is a flowchart of the focus moving process carried out in the step S911. First, in step S1201, the CPU 120 stores an X-coordinate and a Y-coordinate of a touch point as a variable X1 and variable Y1, respectively, in the RAM 122. In step S1202 after the step S1201, the CPU 120 stores an X-coordinate and a Y-coordinate of a touch point as a variable X2 and variable Y2, respectively, in the RAM 122.

In step S1203 after the step S1202, the CPU 120 determines whether or not the distance between the two points (X1, Y1) and (X2, Y2) is equal to or greater than a predetermined value. Namely, in the step S1203, whether or not dragging is being performed is determined. When the CPU 120 determines that the distance between the two points is equal to or greater than the predetermined value (YES in the step S1203), that is, when dragging is being performed, the process proceeds to step S1206, and when the CPU 120 determines that the distance between the two points is smaller than the predetermined value (NO in the step S1203), the process proceeds to step S1204.

In the step S1204, the CPU 120 obtains a touch point again. Then, in step S1205, the CPU 120 determines whether or not the number of touch points is one. When the CPU 120 determines that the number of touch points is one (YES in the step S1205), the process returns to the step S1202, and on the other hand, when the CPU 120 determines that the number of touch points is not one (NO in the step S1205), the process is brought to an end.

In the step S1206, the CPU 120 determines whether or not there is any image including the point (X2, Y2). When the CPU 120 determines that there is any image including the point (X2, Y2) (YES in the step S1206), the process proceeds to step S1207, and on the other hand, when the CPU 120 determines that there is no image including the point (X2,Y2) (NO in the step S1206), the process proceeds to step S1208.

In the step S1207, the CPU 120 moves a focus frame to the image including the point (X2, Y2). In the next step S1208, the CPU 120 obtains a touch point again. Then, in step S1209, the CPU 120 determines whether or not the number of touch points is one. When the CPU 120 determines that the number of touch points is one (YES in the step S1209), the process proceeds to step S1210, and when the CPU 120 determines that the number of touch points is not one (NO in the step S1209), the process is brought to an end. In the step S1210, the CPU 120 sets the X-coordinate and the Y-coordinate of the touch point as X2 and Y2, respectively, and the process returns to the step S1206.

The above described processes following the flowcharts of FIGS. 9 to 12 can realize an operation to move a displayed image as described with reference to FIGS. 7A to 8G.

Moreover, although in the above description of the embodiments, an image displayed singly, an enlarged/reduced image, or multi-displayed (index-displayed) images on the display 101 is subjected to multi-touch operation, the present invention is not limited to this. The present invention restrains momentum scrolling or scrolling due to touch at one point immediately after multi-touch operation and before touch-up at all points, and thus may be applied to any scenes where scrolling by multi-touch operation and touch at one point is possible. Namely, the present invention may be applied to scenes where contents such as a Web screen, a map, a drawing, and a document are displayed.

Further, although in the above description of the embodiments, the present invention is applied to a digital camera, the present invention may be applied to all types of devices insofar as they are capable of deforming and moving an image displayed on a display by multi-touch operation. For example, the present invention may be applied to such devices as a personal computer, a PDA, a cellular phone, a mobile image viewer, a digital photo frame, a game machine, an electronic book reader, a display-equipped printer, and a display-equipped music player, which allow multi-touch operation.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-188619 filed Aug. 29, 2012, which is hereby incorporated by reference herein in its entirety.

What is claimed is:

1. A display control apparatus comprising:
   a touch panel configured to detect at least a touch at one point on a display screen of a display unit; and
   a processor configured to control displaying of the display unit so that:
   when said touch panel detects a touch at one point, and thereafter does not detect touches at a plurality of points until the touch at one point is no longer detected, a display object displayed on the display screen is scrolled after the touch at one point leaves the display screen in response to the touch at one point leaving the display screen while moving on the display screen regardless of whether the touch at one point satisfies a predetermined condition;
   when said touch panel detects touches at a plurality of points, and thereafter detects a touch at only one point, the display object is scrolled in response to moving of a touch position of the touch at one point while the touch at one point is continuously detected regardless of whether the touch at one point satisfies the predetermined condition;
   when said touch panel detects touches at a plurality of points, and thereafter detects a touch at only one point, and when the touch at one point satisfies the predetermined condition, and thereafter, the touch at one point leaves the display screen while moving on the display screen, the display object is scrolled after the touch at one point leaves the display screen; and
   when said touch panel detects touches at a plurality of points, and thereafter detects a touch at only one point, and when the touch at one point leaves the display screen without satisfying the predetermined condition, the display object is not scrolled after the touch at one point leaves the display screen.

2. The display control apparatus according to claim 1, wherein when scrolling the display object after a touch leaves the display screen, said processor controls displaying of the display unit so that the display object is scrolled while decreasing a moving speed of the display object with deceleration corresponding to a moving speed of a touch position of the touch immediately before the touch leaves the display screen, and then scrolling of the display object is stopped.

3. The display control apparatus according to claim 1, wherein when scrolling the display object in response to moving of a touch position of a touch at one point while the touch at one point is continuously detected, said processor controls displaying of the display unit so that the display object is scrolled in accordance with a moving distance of the touch position.

4. The display control apparatus according to claim 1, wherein when said touch panel detects touches at a plurality of points, said processor controls displaying of the display unit so that processing in accordance with a change in touch positions of the touches at the plurality of points is carried out.

5. The display control apparatus according to claim 4, wherein when said touch panel detects touches at a plurality of points, said processor controls displaying of the display unit so that processing in accordance with a change in relative positions of respective touch positions of the touches at the plurality of points is carried out.

6. The display control apparatus according to claim 5, wherein when said touch panel detects touches at two points, said processor controls displaying of the display unit so that the display object is enlarged and displayed on the display screen in response to a distance between touch positions of the touches at the two points being increased.

7. The display control apparatus according to claim 5, wherein when said touch panel detects touches at two points, said processor controls displaying of the display unit so that the display object is reduced and displayed on the display screen in response to a distance between touch positions of the touches at the two points being decreased.

8. The display control apparatus according to claim 1, wherein when said touch panel detects touches at a plurality of points, and thereafter detects a touch at only one point and the touch at one point satisfies another condition different from the predetermined condition is satisfied, said processor controls displaying of the displaying unit so that the display object is scrolled in response to moving of the touch position of the touch at one point while the touch at one point is continuously detected.

9. The display control apparatus according to claim 1, wherein regardless of whether touches at a plurality of points are detected from when said touch panel detects a touch at one point to when no touch is detected, if a moving speed of a touch position of a touch immediately before no touch is detected is equal to or lower than a predetermined speed, said processor controls displaying of the display unit so that the display object is not scrolled after no touch is detected.

10. The display control apparatus according to claim 1, wherein the predetermined condition is a moving distance of a touch position of a touch at one point, when said touch panel detects touches at a plurality of points, and thereafter the touch at only one point is detected, being equal to or greater than a predetermined distance.

11. The display control apparatus according to claim 1, wherein the predetermined condition is a touch duration time period of a touch at one point, when said touch panel detects touches at a plurality of points, and thereafter the touch at only one point is detected, being equal to or greater than a predetermined time period.

12. A control method for a display control apparatus having a display unit that has a display screen and a touch panel configured to detect at least a touch at one point on the display screen, the control method comprising:
   a first control step of, when the touch panel detects a touch at one point, and thereafter does not detect touches at a plurality of points, until the touch at one point is longer detected, controlling displaying of the display unit so that a display object displayed on the display screen is scrolled after the touch at one point leaves the display screen in response to the touch at one point leaving the display screen while moving on the display screen regardless of whether the touch at one point satisfies a predetermined condition;
   a second control step of, when the touch panel detects touches at a plurality of points, and thereafter detects a touch at only one point, controlling displaying of the display unit so that the display object is scrolled in response to moving of a touch position of the touch at one point while the touch at one point is continuously detected regardless of whether the touch at one point satisfies the predetermined condition;

a third control step of, when the touch panel detects touches at a plurality of points, and thereafter detects a touch at only one point, and when the touch at one point satisfies the predetermined condition, and thereafter the touch at one point leaves the display screen while moving on the display screen, controlling displaying of the display unit so that the display object is scrolled after the touch at one point leaves the display screen; and a fourth control step of, when the touch panel detects touches at a plurality of points, and thereafter detects a touch at only one point, and when the touch at one point leaves the display screen without satisfying the predetermined condition, controlling displaying of the display unit so that the display object is not scrolled after the touch at one point leaves the display screen.

13. A display control apparatus comprising:

a touch panel configured to detect at least a touch at one point on a display screen of a display unit; and a processor configured to control displaying of the display unit so that:

when said touch panel detects a touch at one point, and thereafter does not detect touches at a plural points, until the touch at one point is no longer detected, a plurality of items displayed on the display screen are scrolled in response to moving of a touch position of the touch at one point while the touch at one point is continuously detected, and the plurality of items are scrolled after the touch at one point leaves the display screen in response to the touch at one point leaving the display screen while moving on the display screen; and when said touch panel detects touches at a plurality of points, and thereafter detects a touch at only one point an item to be selected is changed from a first item to a second item among the plurality of items in accordance with, without scrolling the plurality of items, a touch position of the touch at one point after the touch at one point satisfies a predetermined condition.

14. The display control apparatus according to claim 13, wherein when said touch panel detects touches at a plurality of points, said processor controls displaying of the display unit so that processing in accordance with a change in touch positions of the touches at the plurality of points is carried out.

15. The display control apparatus according to claim 14, wherein when said touch panel detects touches at two points, said processor controls displaying of the display unit so that an increased number of items are displayed on the display screen in response to a distance between touch positions of the touches at the two points being decreased.

16. A control method for a display control apparatus having a display unit that has a display screen and a touch panel configured to detect at least a touch at one point on the display screen, the control method comprising:

a first control step of, when the touch detection unit detects a touch at one point, and thereafter does not detect touches at a plurality of points, until the touch at one point is not detected, controlling displaying of the display unit so that a plurality of items displayed on the display screen are scrolled in response to moving of a touch position of the touch at one point while the touch at one point is continuously detected, and so that the plurality of items are scrolled after the touch at one point leaves the display screen in response to the touch at one point leaving the display screen while moving on the display screen; and a second control step of, when the touch panel detects touches at a plurality of points, and thereafter detects a touch at only one point, controlling displaying of the display unit so that an item to be selected is changed from a first item to a second item among the plurality of items in accordance with, without scrolling the plurality of items, a touch position of the touch at one point after the touch at one point satisfies a predetermined condition.

17. A non-transitory computer-readable storage medium storing a program executable by a computer to implement a control method for a display control apparatus having a display unit that has a display screen on which a display object is to be displayed and a touch panel configured to detect at least a touch at one point on the display screen, the control method comprising:

a first control step of, when the touch panel detects a touch at one point, and thereafter does not detect touches at a plurality of points, until the touch at one point is longer detected, controlling displaying of the display unit so that a display object displayed on the display screen is scrolled after the touch at one point leaves the display screen in response to the touch at one point leaving the display screen while moving on the display screen regardless of whether the touch at one point satisfies a predetermined condition;

a second control step of, when the touch panel detects touches at a plurality of points, and thereafter detects a touch at only one point, controlling displaying of the display unit so that the display object is scrolled in response to moving of a touch position of the touch at one point while the touch at one point is continuously detected regardless of whether the touch at one point satisfies the predetermined condition;

a third control step of, when the touch panel detects touches at a plurality of points, and thereafter detects a touch at only one point, and when the touch at one point satisfies the predetermined condition, and thereafter the touch at one point leaves the display screen while moving on the display screen, controlling displaying of the display unit so that the display object is scrolled after the touch at one point leaves the display screen; and a fourth control step of, when the touch panel detects touches at a plurality of points, and thereafter detects a touch at only one point, and when the touch at one point leaves the display screen without satisfying the predetermined condition, controlling displaying of the display unit so that the display object is not scrolled after the touch at one point leaves the display screen.

18. A non-transitory computer-readable storage medium storing a program executable by a computer to implement a control method for a display control apparatus having a display unit that has a display screen and a touch panel configured to detect at least a touch at one point on the display screen, the control method comprising:

a first control step of, when the touch panel detects a touch at one point, and thereafter does not detect touches at a plurality of points, until the touch at one point is not detected, controlling displaying of the display unit so that a plurality of items displayed on the display screen are scrolled in response to moving of a touch position of the touch at one point while the touch at one point is continuously detected, and so that the plurality of items are scrolled after the touch at one point leaves the display screen in response to the touch at one point leaving the display screen while moving on the display screen; and a second control step of, when the touch panel detects touches at a plurality of points, and thereafter detects a touch at only one point, controlling displaying of the display unit so that an item to be selected is changed from a first item to a second item among the plurality of items in accordance with, without scrolling the plurality of items, a touch position of the touch at one point after the touch at one point satisfies a predetermined condition.

* * * * *